United States Patent [19]

Reedy

[11] Patent Number: 5,012,473
[45] Date of Patent: Apr. 30, 1991

[54] FIXED WAVELENGTH LASER USING MULTIORDER HALFWAVE PLATE

[75] Inventor: Herman E. Reedy, Adams Township, Butler County, Pa.

[73] Assignee: II-VI Incorporated, Saxonburg, Pa.

[21] Appl. No.: 450,157

[22] Filed: Dec. 13, 1989

[51] Int. Cl.$^5$ ............................................. H01S 3/098
[52] U.S. Cl. ..................................... 372/19; 372/105; 372/106
[58] Field of Search .................. 372/9, 19, 98, 105, 372/106, 10, 12, 13, 20

[56] References Cited

U.S. PATENT DOCUMENTS

| | | | |
|---|---|---|---|
| 3,407,364 | 10/1968 | Turner | 332/7.51 |
| 3,435,371 | 3/1969 | White | 372/105 |
| 3,824,492 | 7/1974 | Brienza et al. | 372/105 |
| 3,858,963 | 1/1975 | Riley | 372/98 |
| 4,084,883 | 4/1978 | Eastman et al. | 350/152 |
| 4,176,327 | 11/1979 | Wayne et al. | 372/105 |
| 4,305,046 | 12/1981 | Le Floch et al. | 331/94.5 |
| 4,515,441 | 5/1985 | Wentz | 350/395 |

OTHER PUBLICATIONS

David L. J. Lunt, Thin-Film Polarizers, Burleigh Northwest Optical Inc. 11/82.
Thin Film Polarizers, 1/87, Two—Six Incorporated.
Control of the Laser Wavelength, 1981 Engineering Technology.
Hecht and Zajac, *Optics*, Addison-Wesley Publishing, Reading, Mass., 1979 pp. 244-249.

Primary Examiner—Frank Gonzalez
Assistant Examiner—Susan S. Morse
Attorney, Agent, or Firm—Webb, Burden, Zeisenheim & Webb

[57] ABSTRACT

A laser adapted to operate at a constant, predetermined wavelength includes the following elements disposed in order within a laser cavity and aligned along the path of light flow therethrough: a highly reflective rear mirror, a halfwave plate, a Brewster window, an active laser medium, and an output coupler. The halfwave plate is designed to rotate incident light beams by 180° at the predetermined wavelength and to rotate incident light beams by an amount other than 180° at wavelengths other than the predetermined wavelength. In a preferred embodiment, the Brewster window is a thin film polarizer designed for the predetermined wavelength.

16 Claims, 3 Drawing Sheets

FIXED WAVELENGTH LASER USING MULTIORDER HALFWAVE PLATE

BACKGROUND OF THE INVENTION

1. Field of the Invention

This invention relates to lasers and, more particularly, to lasers which operate at a predetermined and fixed wavelength.

2. Background Art

Although lasers are usually thought of as sources of monochromatic light, all lasers actually emit light at multiple wavelengths simultaneously. For example, a $CO_2$ laser can be made to emit at least 400 individual wavelengths in the 8.7–11.8 micron range when isotopes in addition to $^{12}C^{16}O_2$ are used. Moreover, in most lasers, the width of the broadened laser line contains several longitudinal cavity modes which permits the laser to oscillate at several closely-spaced wavelengths at once.

Many laser applications require that the laser output be at a particular and constant wavelength. For example, applications in holography often require long coherence lengths that can be achieved only if the laser operates in a single, longitudinal mode. Applications in spectroscopy, photochemistry and isotope separation require a laser having a specific wavelength and a narrow bandwidth.

A wide variety of arrangements are known for controlling a laser to operate at a particular wavelength. As a general rule, it is desirable to selectively increase the cavity loss for the other wavelengths where the active medium produces gain, but without increasing loss at the desired wavelength. Known arrangements include such passive devices as tuning prisms, diffraction gratings, filters positioned at Brewster's angle, Fabry-Perot etalon plates and tuning wedges. However, these devices have a number of disadvantages. For example, prisms are not particularly effective in selecting one wavelength from a plurality of closely-spaced wavelengths. Diffraction gratings are difficult and expensive to manufacture and also introduce substantial energy losses at the desired wavelength. As a result, the laser must be operated at higher input power levels to obtain the same output power level, thus adding expense and inefficiencies to the laser system.

The operating wavelength of a laser can also change due to physical changes in the cavity length as the system operates, generally changes from expansion or contraction due to temperature variations. The highly reflective mirror at one end of the laser cavity has been mounted on a piezoelectric crystal to change the position of the mirror as the cavity length changes. The problem with such an arrangement is that the laser system must additionally include complicated and expensive devices for measuring deviations from the desired wavelength and energizing the piezoelectric crystal to compensate for any changes in wavelength.

Mirrors which reflect only at the desired wavelength and at no other wavelength have also been proposed. Other arrangements for controlling the operating wavelength of a laser are shown in U.S. Pat. Nos. 4,305,046; 4,558,452; 4,615,034; and 4,701,924.

It is an object of the present invention to provide a passive arrangement for accurately, reliably and inexpensively selecting a particular operating wavelength for a laser, but without diminishing the output of the laser.

SUMMARY OF THE INVENTION

Accordingly, I have invented a laser adapted to operate at a constant, predetermined wavelength. The laser includes a highly reflective rear mirror at one end of a laser cavity and an output coupler spaced from and aligned with the rear mirror at an outlet end of the laser cavity. An active laser medium is positioned between and is in alignment with the rear mirror and the output coupler. A Brewster window is positioned between and aligned with the rear mirror and the active laser medium. A halfwave plate is positioned between and aligned with the rear mirror and the Brewster window The halfwave plate is designed to rotate incident light beams travelling therethrough by 180° at the predetermined wavelength and to rotate incident light beams travelling therethrough by an amount other than 180° at wavelengths other than the predetermined wavelength.

In the preferred embodiment, the halfwave plate is a multiorder halfwave plate and the active laser medium is a gas discharge area. In addition, the Brewster window is advantageously a thin film polarizer designed to reflect substantially all of the S-polarization of incident light beams, to transmit substantially all of the P-polarization of incident light beams at the predetermined wavelength and to transmit less than substantially all of the P-polarization of incident light beams of wavelengths other than the predetermined wavelength.

The halfwave plate can be formed from a single crystal, birefringent material, such as cadmium sulfide, cadmium selenide and magnesium fluoride. The thin film polarizer can be a zinc selenium-based thin film polarizer.

DESCRIPTION OF THE PREFERRED EMBODIMENTS

Figure 1:
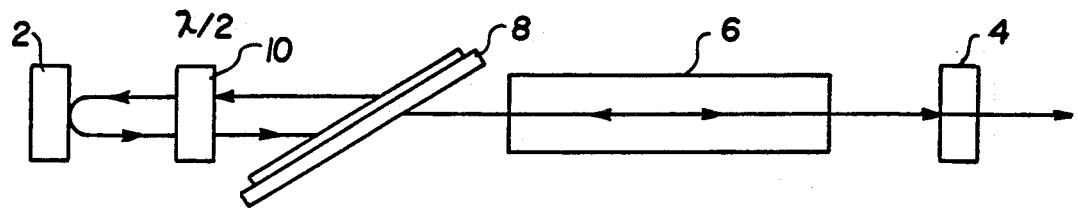
FIG. 1 is a block diagram of a laser arrangement in accordance with the present invention.

A laser arrangement in accordance with a preferred embodiment of the present invention is set forth in block diagram format in FIG. 1. The laser includes a highly reflective, rear mirror 2 which is spaced from and aligned with an output coupler 4. The output coupler 4 is partially reflective and partially transmissive. An active laser medium 6 is positioned between and aligned with the rear mirror 2 and the output coupler 4. The active laser medium 6 can be a gas discharge area, a solid state material, or the like, each connected to a means for pumping the laser material to the necessary state of excitation for the lasing effect to take place. The active laser medium 6 will hereinafter be referred to as a gas discharge area 6 since the present invention is particularly useful in connection with gas lasers. Typical gases used in a gas laser include $CO_2$, CO, HF/DF, He/Ne, and the like.

A Brewster window 8 is positioned between the rear mirror 2 and the gas discharge area 6, preferably immediately adjacent the end of the gas discharge area 6 nearest the rear mirror 2. The Brewster window 8 can also form one end of a housing defining the gas discharge area 6.

The rear mirror 2, output coupler 4, gas discharge area 6 and Brewster window 8 are common elements in known lasers and are either located within or form a laser cavity. However, in accordance with the present invention, a halfwave plate 10 is positioned within the laser cavity between the rear mirror 2 and the Brewster window 8 and intercepting the light beam in the laser shown in FIG. 1.

The halfwave plate 10 is a passive retardation device. When a plane polarized beam is incident upon the plate, the beam is resolved into two components. These components propagate through the halfwave plate at different velocities and recombine upon exiting the plate with a new polarization. In other words, the ordinary and extraordinary rays travel at different velocities through the halfwave plate, with one ray retarded relative to the other. In accordance with the present invention, the halfwave plate 10 is designed to rotate the beam of light by 180° only at the particular desired wavelength for the laser. Other wavelengths will be rotated by an amount more or less than 180° and introduce power losses at those wavelengths.

As shown diagrammatically in FIG. 1, the light travelling through the Brewster window 8 toward the halfwave plate 10 will, upon passage therethrough, be rotated by 180° at the particular design wavelength. The light will then travel to the rear mirror 2 where it will be totally reflected and redirected back through the halfwave plate 10. By once again passing through the halfwave plate 10, light at the design wavelength will be rotated by another 180°. In effect, light at the design wavelength for the halfwave plate 10 will be rotated a full 360° as it passes twice through the halfwave plate 10 and will be essentially unchanged at the original point of entry. However, light having other wavelengths will be rotated by an amount more or less than 180° on each passage through the halfwave plate 10. As a result, light having wavelengths other than the design wavelength for the halfwave plate 10 will be rotated by an amount more or less than 360° as it emerges from the initial entry point. This will introduce losses in the system which will prevent the laser from operating at wavelengths other than the design wavelength of the halfwave plate 10.

Halfwave plates per se are known in the art. A halfwave plate is generally considered to be one or more orders of a single crystal birefringent material, such as cadmium sulfide, cadmium selenide or magnesium fluoride. A halfwave plate can be made by selecting the thickness in accordance with the particular wavelength desired. The thickness for the lowest order halfwave plate (referred to as a ½ order plate) for a particular wavelength is set forth by the following equation:

$$d = \frac{N\lambda}{n_e - n_o}, \text{ where}$$

d = physical thickness of the halfwave plate.
N = wave plate order (i.e., ½, 3/2, 5/2, etc).
$\lambda$ = desired wavelength
$n_e$ = refractive index of extraordinary ray.
$n_o$ = refractive index of ordinary ray.

Figure 2:
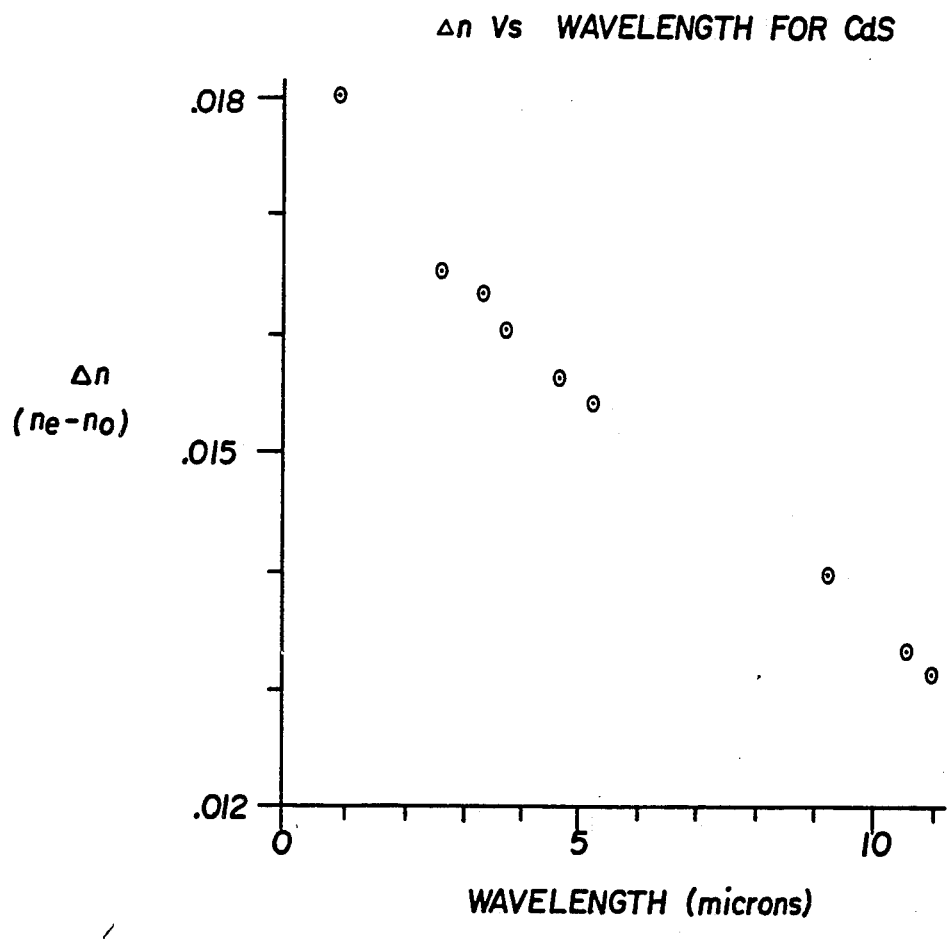
FIG. 2 is a graph showing $\Delta$ n vs. wavelength for cadmium sulfide.

The difference between the refractive index of the extraordinary ray and the refractive index of the ordinary ray ($n_e - n_o$) is referred to as $\Delta n$ and is constant at a particular wavelength for a particular material. These FIGURES for $\Delta n$ for various materials are known in the art. A graph of $\Delta n$ at various wavelengths for cadmium sulfide material is shown in FIG. 2. As an example, $\Delta n$ is equal to about 0.0133 for cadmium sulfide at 10.59 microns. The thickness for various orders of a halfwave plate made from cadmium sulfide for 10.59 microns is calculated as follows:

$$d = \frac{\frac{1}{2}(10.59 \times 10^{-6})(39.37)}{.0133}$$

39.37 is the conversion factor from microns to inches. Accordingly, d = 0.0156" for a ½ order halfwave plate. The thickness of a 3/2 order cadmium sulfide halfwave plate for 10.59 microns would be three times the thickness of a ½ order plate, or 0.0468". The thickness of a 5/2 order cadmium sulfide halfwave plate for 10.59 microns would be five times the thickness of a ½ order plate, or 0.078". The thickness of other higher order halfwave plates at 10.59 microns would be similarly established. The thickness of cadmium sulfide halfwave plates for other wavelengths would be calculated by using a different value for $\Delta n$.

Figure 3:
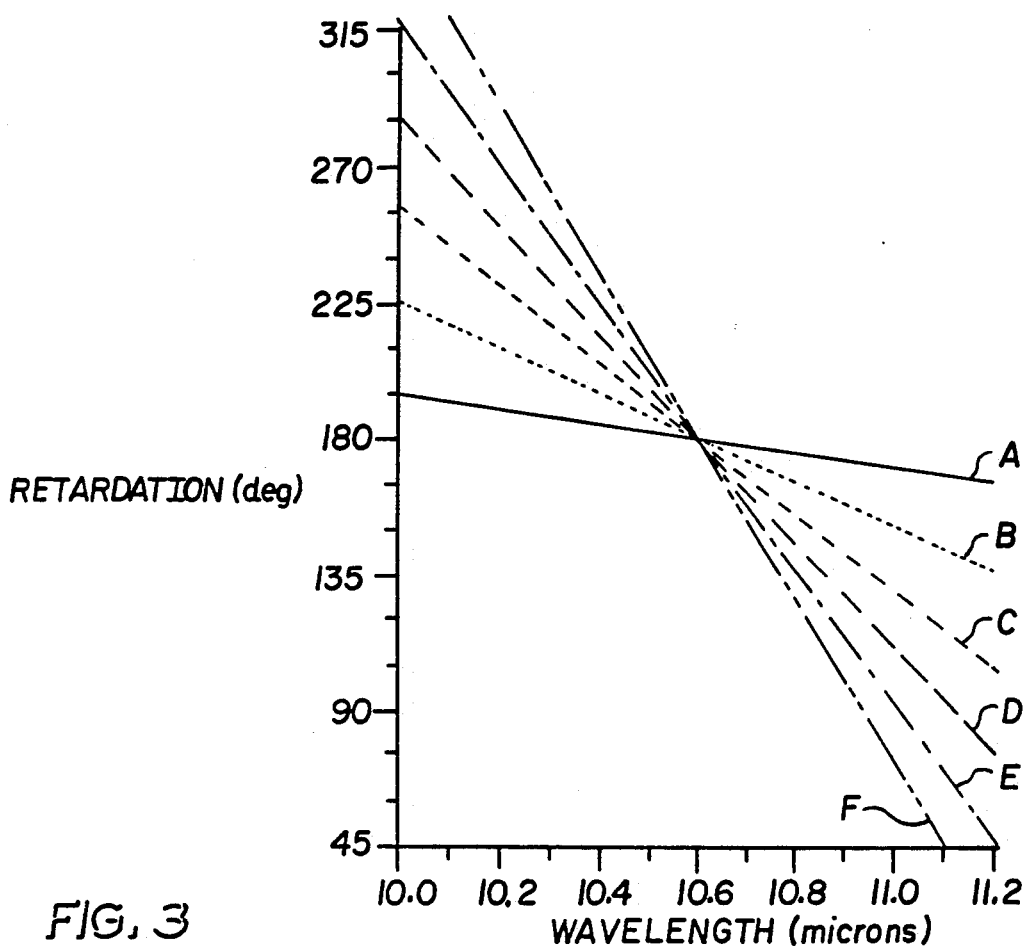
FIG. 3 is a graph showing retardation vs. wavelength for various orders of cadmium sulfide halfwave plates designed for 10.59 microns.

By increasing the order of the halfwave plate, in other words, by increasing N in the equation discussed above, and appropriately increasing the thickness of the plate at a desired wavelength, the selectivity of the halfwave plate can be increased. This is the result of ever increasing deviations of the retardation of the light beam from 180° at wavelengths other than the desired wavelength. This is illustrated in FIG. 3 which shows a plurality of curves, labeled A, B, C, D, E and F, which are the plots of retardation vs. wavelength for halfwave plates of ½, 3/2, 5/2, 7/2, 9/2 and 11/2 order, respectively. The retardation for the various orders of halfwave plates is consistently at 180° for the desired 10.59 micron wavelength. However, as the order of the plate is increased, the retardation is increasingly greater than 180° at wavelengths lesser than 10.59 microns and is increasingly smaller than 180° for wavelengths greater than 10.59 microns. In other words, the slope of the curves for higher order halfwave plates is increasingly greater. In this manner, the selectivity is increased by using higher order halfwave plates, since the losses at wavelengths other than the design wavelength increase at a greater rate.

Therefore, a preferred embodiment of the present invention will use a higher order or multiorder halfwave plate to more particularly and precisely select the desired wavelength for transmission.

If the halfwave plate is used in connection with a standard Brewster window positioned at Brewster's angle, then good results will be obtained in connection with operating the laser at the design wavelength.

However, the performance can be improved by using a thin film polarizer in place of the standard Brewster window. A thin film polarizer in general will pass the P-polarization of an incident light beam and reject the S-polarization of the same light beam. A standard Brewster window will reject only about 50%-80% of the S-polarization, but a thin film polarizer will reject up to 99% of the S-polarization at the design wavelength. This will make the system much more selective since the halfwave plate modifies the light beam at wavelengths other than the design wavelength to have increasing proportions of S-polarization. Thus, the gain at wavelengths other than the design wavelength is further reduced.

Thin film polarizers are known in the art. See U.S. Pat. Nos. 4,515,441 and 4,084,883, and also a product brochure entitled "Thin Film Polarizers" of II-VI Incorporated, the assignee of the present application. A thin film polarizer is a complicated structure formed of a base material, such as zinc selenide or germanium, and a plurality of layers of material on the base. The layers generally alternate between a material having a low index of refraction and a material having a high index of refraction. The particular materials selected, the thickness of each layer, and the number of layers used are dictated by the design wavelength for the thin film polarizer, as is known in the art. The arrangement makes the thin film polarizer transmit nearly 100% of the P-polarization of an incident light beam at the design wavelength, transmit less than 100% of the P-polarization of the light beam at other wavelengths, and reflect nearly all of the S-polarization of the light beam at all wavelengths.

Figure 4:
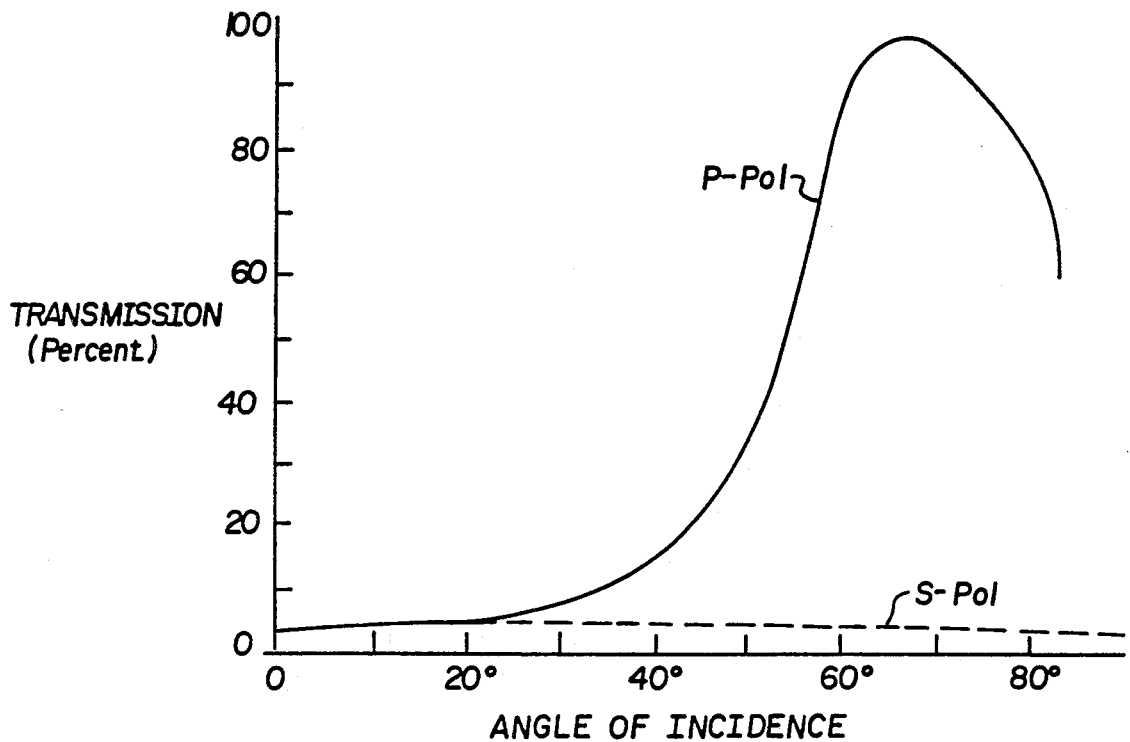
FIG. 4 is a graph showing transmission vs. angle of incidence for a zinc selenide thin film polarizer designed for 10.59 microns.

A plot of the percent transmission vs. angle of incidence for the S-polarization and the P-polarization of a zinc selenium thin film polarizer designed for 10.59 microns, and manufactured and sold by II-VI Incorporated, is shown in FIG. 4. It is critical that the thin film polarizer be positioned at the Brewster angle for the desired wavelength to maximize the transmission of the P-polarization of the incident beam. This angle is 67.4° for the 10.59 micron zinc selenium thin film polarizer.

Figure 5:
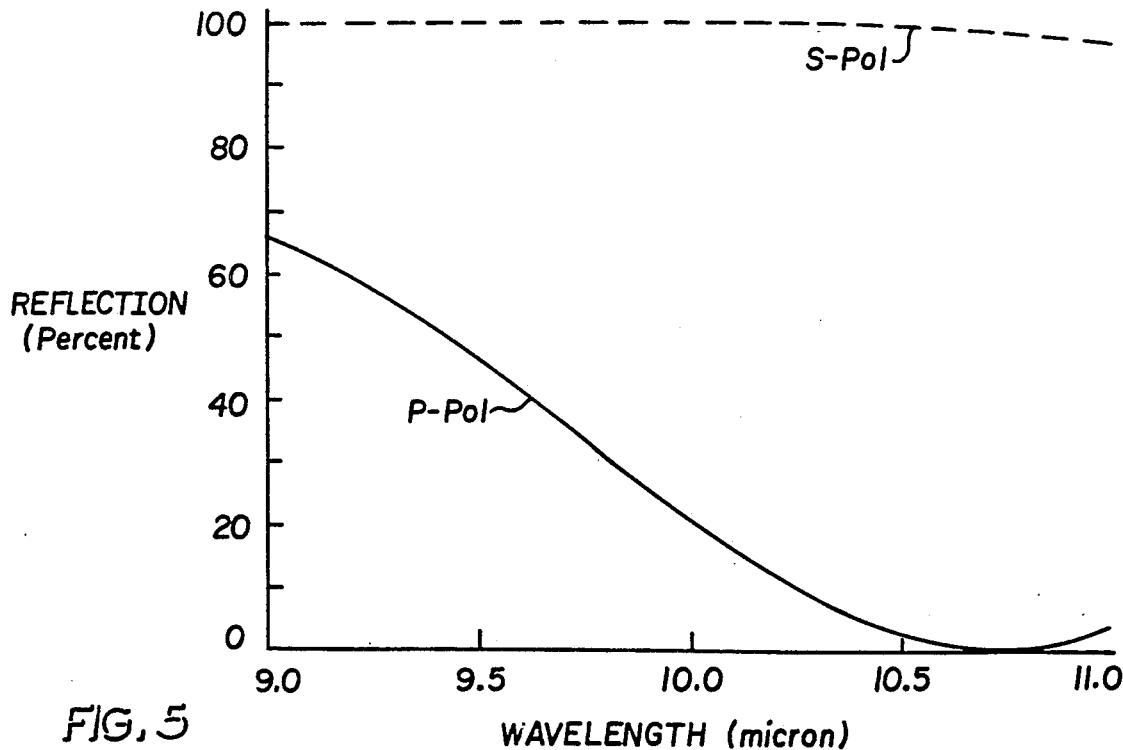
FIG. 5 is a graph showing reflection vs. wavelength for a zinc selenide thin film polarizer designed for 10.59 microns.

FIG. 5 shows how the same zinc selenium thin film polarizer designed for 10.59 microns has its percent reflection of P-polarization decreasing to zero at the design wavelength. The S-polarization remains at 100% reflection over the range of wavelengths shown in FIG. 5. By using a thin film polarizer designed for a particular wavelength, the laser arrangement shown in FIG. 1 can be made more selective and further insure that the laser will operate at the design wavelength over normal operations.

Figure 6:
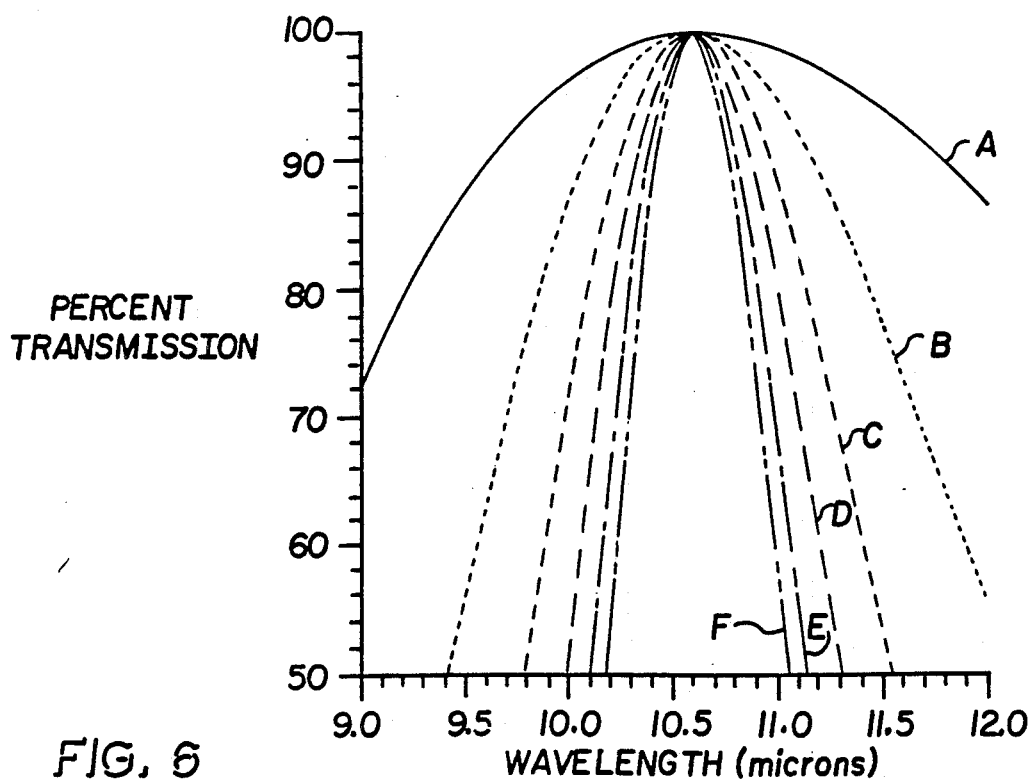
FIG. 6 is a graph showing the effective net transmission of a laser cavity having a cadmium sulfide halfwave plate and a zinc selenide thin film polarizer, both designed for 10.59 microns.

FIG. 6 is a graph showing the effective net transmission at various wavelengths of a laser cavity using both a cadmium sulfide halfwave plate designed for 10.59 microns and a thin film polarizer designed for 10.59 microns. Curve A is the percent transmission vs. wavelength for a laser cavity having a ½ order cadmium sulfide halfwave plate and a zinc selenide thin film polarizer, both designed for 10.59 microns. Curve A has a relatively wide bandwidth, but the 100% transmission level is located at and near 10.59 microns. However, as the order of the halfwave plate is increased, as shown in curves B through F, then the bandwidth narrows substantially and the transmission level drops off dramatically at wavelengths on either side of 10.59 microns. This is particularly important since only small deviations from 100% transmission can prevent the laser from lasing at a particular wavelength. Similar curves could be obtained if a standard Brewster window were used in place of the thin film polarizer, however, these curves would be broader and not drop off as sharply as the curves shown in FIG. 6.

Therefore, a preferred embodiment of the present invention will use a thin film polarizer in conjunction with the multiorder halfwave plate.

Having described above the presently preferred embodiments of the present invention, it is to be understood that it may be otherwise embodied within the scope of the appended claims.

I claim:

1. A laser adapted to operate at a constant predetermined wavelength comprising: a highly reflective, rear mirror at one end of a laser cavity, an output coupler spaced from and aligned with said rear mirror at an outlet end of said laser cavity, an active laser medium positioned between and in alignment with said rear mirror and said output coupler, a thin film polarizer intermediate said rear mirror and said active laser medium, and a multiorder halfwave plate positioned between and aligned with said rear mirror and said thin film polarizer, with said halfwave plate designed to rotate incident light beams traveling therethrough by 180° at said predetermined wavelength and to rotate incident light beams traveling therethrough by an amount other than 180° at wavelengths other than said predetermined wavelength, and with said thin film polarizer designed to reflect substantially all of the S-polarization of incident light beams, to transmit substantially all of the P-polarization of incident light beams at said predetermined wavelength, and to transmit less than substantially all of the P-polarization of incident light beams at wavelengths other than said predetermined wavelength.

2. The laser of claim 1 wherein said active laser medium is a gas discharge area.

3. The laser of claim 1 wherein said active laser medium is a gas discharge area.

4. The laser of claim 1 wherein said multiorder halfwave plate is formed from multiple orders of a single crystal birefringent material selected from the group consisting of cadmium sulfide, cadmium selenide and magnesium fluoride.

5. The laser of claim 4 wherein the thickness of the halfwave plate for said predetermined wavelength is calculated by the following formula:

$$d = \frac{N\lambda}{n_e - n_o},$$

d = physical thickness of the halfwave plate,
N = wave plate order,
λ = predetermined wavelength in microns,
$n_e$ = refractive index of extraordinary ray, and
$n_o$ = refractive index of ordinary ray.

6. The laser of claim 1 wherein said thin film polarizer is a zinc selenium based thin film polarizer.

7. A laser adapted to operate at a constant predetermined wavelength comprising the following elements, in the order set forth, disposed within a laser cavity and aligned along the path of light flow through the laser cavity: a highly reflective, rear mirror at one end of the laser cavity, a multiorder halfwave plate, a thin film polarizer, an active laser medium, and an output coupler at an outlet end of said laser cavity, with said halfwave plate designed to rotate incident light beams traveling therethrough by 180° at said predetermined wavelength and to rotate incident light beams traveling therethrough by an amount other than 180° at wavelengths other than said predetermined wavelength, and with said thin film polarizer designed to reflect substantially all of the S-polarization of incident light beams, to transmit substantially all of the P-polarization of incident light beams at said predetermined wavelength, and to transmit less than substantially all of the P-polarization of incident light beams at wavelengths other than said predetermined wavelength.

8. The laser of claim 7 wherein said active laser medium is a gas discharge area.

9. The laser of claim 7 wherein said active laser medium is a gas discharge area.

10. The laser of claim 7 wherein said halfwave plate is formed from multiple orders of a single crystal birefringent material selected from the group consisting of cadmium sulfide, cadmium selenide and magnesium fluoride.

11. The laser of claim 10 wherein the thickness of the halfwave plate for said predetermined wavelength is calculated by the following formula:

$$d = \frac{N\lambda}{n_e - n_o},$$

where
 d = physical thickness of the halfwave plate,
 N = waveplate order,
 $\lambda$ = desired wavelength in microns,
 $n_e$ = refractive index of extraordinary ray, and
 $n_o$ = refractive index of ordinary ray.

12. The laser of claim 7 wherein said thin film polarizer is a zinc selenium based thin film polarizer.

13. A laser adapted to operate at a constant, predetermined wavelength comprising the following elements, in the order set forth, disposed within a laser cavity and aligned along the path of light flow through the laser cavity: (a) a highly reflective mirror at one end of the laser cavity; (b) a multiorder halfwave plate designed to rotate incident light beams traveling therethrough by 180° at said predetermined wavelength and to rotate incident light beams traveling therethrough by an amount other than 180° at wavelengths other than said predetermined wavelength; (c) a thin film polarizer designed to reflect substantially all of the S-polarization of incident light beams, to transmit substantially all of the P-polarization of incident light beams at said predetermined wavelength, and to transmit less than substantially all of the P-polarization of incident light beams at wavelengths other than said predetermined wavelength; (d) a gas discharge area; and (e) an output coupler at an outlet end of said laser cavity.

14. The laser of claim 13 wherein said halfwave plate is formed from multiple orders of a single crystal, birefringent material selected from the group consisting of cadmium sulfide, cadmium selenide and magnesium fluoride.

15. The laser of claim 14 wherein the thickness of the halfwave plate for said predetermined wavelength is calculated by the following formula:

$$d = \frac{N\lambda}{n_e - n_o},$$

where
 d = physical thickness of the halfwave plate,
 N = waveplate order,
 $\lambda$ = desired wavelength in microns,
 $n_e$ = refractive index of extraordinary ray, and
 $n_o$ = refractive index of ordinary ray.

16. The laser of claim 15 wherein said thin film polarizer is a zinc selenium based thin film polarizer.

* * * * *